United States Patent [19]

Gaskill, Jr. et al.

[11] 4,086,657
[45] Apr. 25, 1978

[54] FIVE-STAGE FOUR-BIT COMPLEX MULTIPLIER

[75] Inventors: James R. Gaskill, Jr., Pacific Palisades; Lawrence R. Weill, Seal Beach, both of Calif.

[73] Assignee: The United States of America as represented by the Secretary of the Air Force, Washington, D.C.

[21] Appl. No.: 715,581

[22] Filed: Aug. 18, 1976

[51] Int. Cl.² ............................................. G06F 7/52
[52] U.S. Cl. ...................................................... 364/757
[58] Field of Search ................................. 235/164, 156

[56] References Cited

U.S. PATENT DOCUMENTS

| | | | |
|---|---|---|---|
| 3,673,399 | 6/1972 | Hancke et al. | 235/156 |
| 3,725,686 | 4/1973 | Ustach | 235/156 |
| 3,800,130 | 3/1974 | Martinson | 235/156 |
| 3,803,390 | 4/1974 | Schaepman | 235/152 |
| 3,866,030 | 2/1975 | Baugh et al. | 235/164 |
| 3,926,367 | 12/1975 | Bond et al. | 235/156 X |
| 3,956,622 | 5/1976 | Lyon | 235/164 |

Primary Examiner—David H. Malzahn
Attorney, Agent, or Firm—Joseph E. Rusz; Julian L. Siegel

[57] ABSTRACT

A multiplying system for complex numbers using four three-stage 4 × 4 bit 2's complement multipliers and a modified adder and subtractor. Two of the 2's complement multipliers are fed to the subtractor which produces a 9 bit output representing the real term of the complex product and the other 2's complement multipliers are fed to the adder which produces a 9 bit output representing the imaginary term of the complex product. Each of the 3-stage 2's complement multipliers are modified from prior art multipliers to effect the two most significant bits. The unique adder and subtractor as well as the multipliers are implemented with universal logic gates consisting of cascode circuit components resulting in five gating stages for the complex multiplying system.

9 Claims, 12 Drawing Figures

FIVE-STAGE FOUR-BIT COMPLEX MULTIPLIER

STATEMENT OF GOVERNMENT INTEREST

The invention described herein may be manufactured and used by or for the Government for governmental purposes without the payment of any royalty thereon.

BACKGROUND OF THE INVENTION

This invention relates to binary multiplying systems, and more particularly to a 2's complement multiplying system of complex numbers.

Complex multipliers or equivalent logic circuits made up of multiplier and adder building blocks are used to perform vector rotation operations in filter sections of digital radar signal processors and of digital communication equipment. Frequently in these units and in other similar applications albeit low precision (4–12 bit) complex multiplications are performed at rates of $10^6 - 10^8$ operations per second. Therefore, very high speed complex multiplier units which the present invention describes can be used in such filter sections to replace larger numbers of slower complex multipliers such as currently used thereby reducing equipment cost. In addition, the high speed complex multipliers can be used to effect improved processor performance.

In the prior art, complex multiplication has frequently been implemented in signal processors using adder and real multiplier building blocks. In some other processors, however, read only memory circuits are used in conjunction with special logic circuitry to effect complex multiplication or complex multiplication-like operations tailored to meet specific internal processor requirements. When read only memories or combinations of available integrated circuit multipliers and adders are used, the number of gating stages, and hence the time delay through the complex are larger than they are when the subject invention is used. Thus the subject invention permits a reduction in complex multiply time or equivalently an increase in the through-put rate of the processing equipment in which it is used.

The performance of complex multipliers built using discrete multipliers and adders depends on the performance of these discrete components and the method of interconnecting them. If prior art commercial MSI circuits and ICs were used to "build up" the component multipliers and adders, then an ensemble complex multiplier delay of ~50 nsec would be required for a circuit performing the same operation as that performed by the complex multiplier disclosed herein. This assumes that ECL-10000 class integrated circuit processing technology is used to fabricate the integrated circuits, and that these circuits are interconnected using multilayer printed circuit boards. If discrete small scale integrated universal logic gate (ULG) implemented adders and multipliers as are described in the present invention were used, however, complex multiplier propagation delay of ~25 nsec could be achieved with multi-layer printed circuit board interconnection of these circuits.

The specific propagation delay through a complex multiplier in general depends on the performance of the devices such as transistors incorporated in the integrated circuit logic elements, the manner in which these elements are interconnected, and the number of gating stages in the complex multiplier network. On the assumption that a given integrated circuit processing technology is used to fabricate the integrated circuit logic elements, e.g, gates or cascode cells, then the delay through an individual gate or cascode cell will be approximately constant and the delay through the complete complex multiplier will depend only on the interconnection method and the number of stages in the network. In this regard, if current production ECL-10000 class processing is used, each gate or cascode cell will introduce a delay of approximately 2.5 – 3.5 nsec. However, if currently available dielectrically isolated ECL fabrication technology is used instead and if at the same time the gate or cascode cell circuits are designed for maximum speed, with correspondingly higher power dissipation, then each gate or cascode cell will introduce a delay of approximately 0.25 – 0.35 nsec. Moreover, in the future when electron beams are used to fabricate much smaller devices with dielectrically isolated technology, individual cell or gate delay may be further reduced, for example, to about 0.1 nsec.

The method of interconnecting the gate or cascode cell elements is a second factor strongly effecting the performance of a logic network such as a complex multiplier. If the cells or gates are built in small numbers as individual integrated circuit chips and these circuits are packaged and interconnected on printed circuit boards, the delay will be greater than if the individual chips are assembled, for example, in a single hybrid module. Still further, delay reduction will be achieved if the gates or cells are arranged on a small number of large scale integrated circuit dice. The delay reduction is achieved by reducing the length of the interconnection wiring between the cells or gates.

However, regardless of the integrated circuit fabrication technology and the method of interconnection, the subject invention permits reducing the delay through a complex multiplier logic network. This delay reduction is achieved because a new logic design is used which requires only a five gating stage ULG network implementation. Therefore the delay introduced by the additional, for example, five more gating stages in more conventional designs, and the delay introduced in the wiring to interconnect these additional stages is eliminated. The new logic design permitting these reductions is summarized next and then described in greater detail.

SUMMARY OF THE INVENTION

A logic design for a 4 bit (4I, 4Q) $\times$ (4I, 4Q) 2's complement complex multiplier is disclosed herein. This multiplier forms two 9 bit output 2's complement arrays, U and V, which in a conventional complex multiplier design would be implemented as $$U + iV = (a+ib)(c+id) = (ac-bd) + i(ad+bc).$$

The logic design described more fully in the following incorporates four 2's complement three-stage 4 $\times$ 4 bit real multiplier sections, of the type described in U.S. Pat. No. 3,914,589, issued to J. R. Gaskill, Jr. and L. R. Weill, but modified for this application. (Conventional 4 $\times$ 4 bit 2's complement multipliers usually require seven gating stages, use very different designs and would not be as useful.) Each of these identical multiplier sections may be developed by changing the circuitry which realizes the two most significant output bits in the logic design described in U.S. Pat. No. 3,914,589. Also included in the complex multiplier logic design are novel subtractor and adder sections. The first of these is driven by a pair of modified multiplier sections and is used to generate the "U" output array. The second adder section is driven by another pair of modified multipliers and used to generate the "V" output array. Both the adder and the subtractor section logic designs are also unique in this application.

It is therefore an object of the invention to provide a novel and improved 2's complement multiplying system for complex numbers.

It is another object to provide a 2's complement complex multiplying system that produces the complex product in five gating stages thereby obtaining high speed performance.

These and other objects, features and advantages of the invention will become more apparent from the following description when taken in conjunction with the illustrative embodiment of the invention in the accompanying drawings.

DESCRIPTION OF THE DRAWINGS

FIG. 4 is a diagram showing a 4 × 4 bit 2's complement multiplier modified for adaptation in to the present invention;

FIGS. 10a and 10b are logic diagrams for generating the least significant bits of the real and imaginary terms of the complex product.

DETAILED DESCRIPTION OF THE PREFERRED EMBODIMENT

Figure 1:
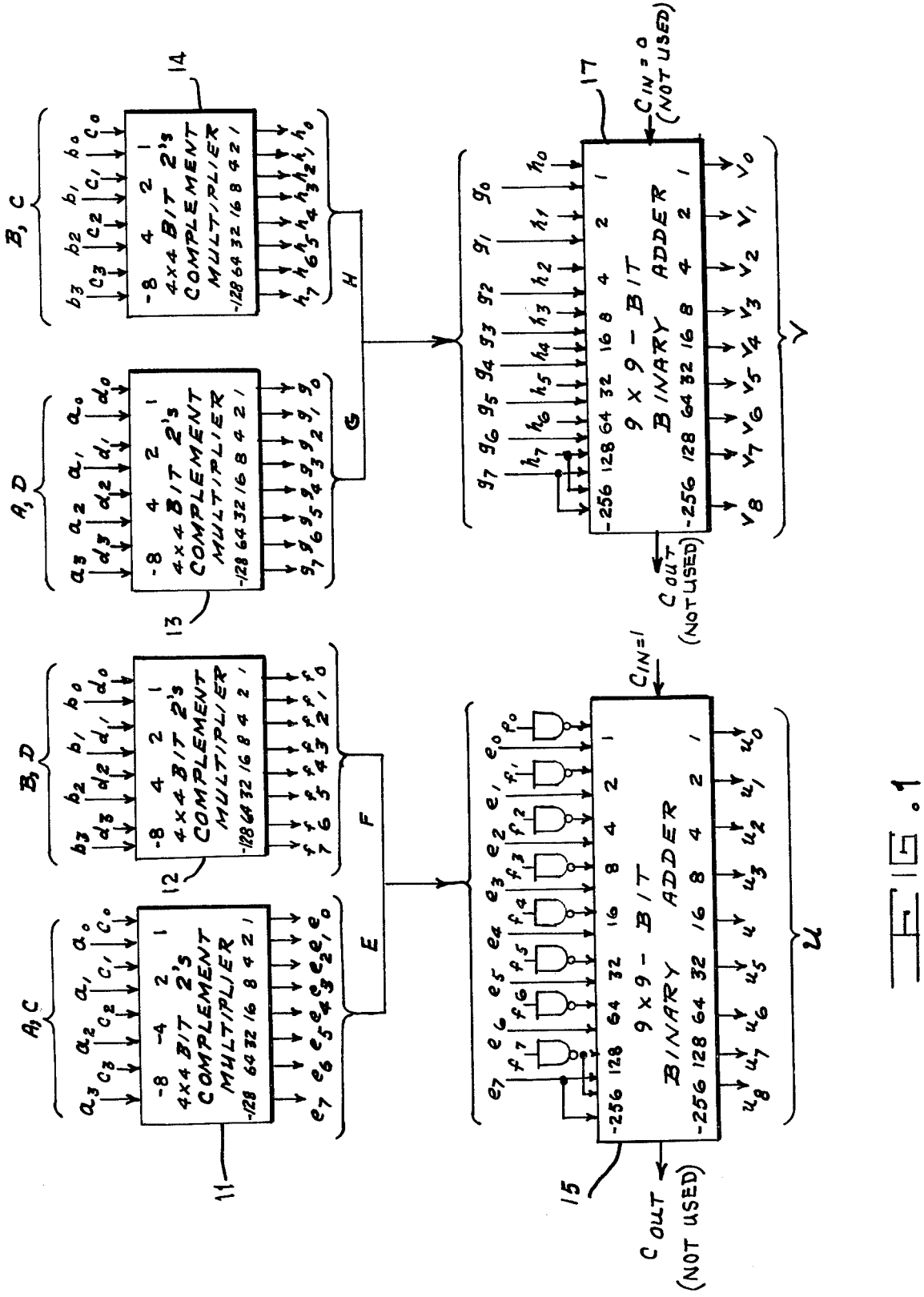
FIG. 1 is a diagram showing the baseline design for a multiplying system for complex numbers using four 4 × 4 bit 2's complement multipliers.

Referring to FIG. 1, there is shown a complex multiplier baseline design which includes four 4 × 4 bit 2's complement multipliers 11-14 and two 9 × 9 bit binary adders 15 and 17 which have carry in capability. This design can be built with readily available components. This complex multiplexing system produces two 9 bit outputs U and V which form the complex product $U + iV$ of $(A + iB)(C + iD)$. Upon expansion these terms become $(AC - BD) + i(AD + BC)$ where $U = AC - BD$ and $V = AD + BC$.

The signed integer value of the inputs $$A = a_3, a_2, a_1, a_0$$

$$B = b_3, b_2, b_1, b_0$$

$$C = c_3, c_2, c_1, c_0$$

$$D = d_3, d_2, d_1, d_0$$

conveyed by each 2's complement coded signal array may be determined by assignment of weights (−8, 4, 2, 1) respectively to its 3rd through 0th bits.

The 2's complement coded products computed by the component 4 × 4 bit real multipliers $$E = e_7, e_6, e_5, e_4, e_3, e_2, e_1, e_0$$

$$F = f_7, f_6, f_5, f_4, f_3, f_2, f_1, f_0$$

$$G = g_7, g_6, g_5, g_4, g_3, g_2, g_1, g_0$$

$$H = h_7, h_6, h_5, h_4, h_3, h_2, h_1, h_0$$

may be evaluated similarly as signed integers, and the complex multiplier outputs $$U = u_8, u_7, u_6, u_5, u_4, u_3, u_2, u_1, u_0$$

$$V = v_8, v_7, v_6, v_5, v_4, v_3, v_2, v_1, v_0$$

are 2's complement codes for signed integers obtainable by associating the 8th – 0th bit in either array with the weights (−256, 128, 64, 32, 16, 8, 4, 2, 1). In forming the 2's complement sum, $G + H = V$, the most significant bit (MSB) and the next MSB of each input signal array to the 9 × 9 bit adder 15 are hardwired together. This signal connection "expands" each input 2's complement code to 9 bits so that with the adder's 10th output bit ($C_{OUT}$) discarded, it forms the 9 bit 2's complement code representing V for $$-112 \leq V \leq 128.$$

Computation of the 2's complement code conveying the difference $E - F = U$ is accomplished at the 9 × 9 bit adder 15. There the "2's complement inverse" of F is formed through the bitwise logical complementation of each input signal $f_i$ and through the subsequent addition of "1" to the $f_i$ array through the adder's carry-input ($C_1 = 1$). Then this "inverse" is added to E, with both input codes "expanded" to 9 bits beforehand.

Figure 2:
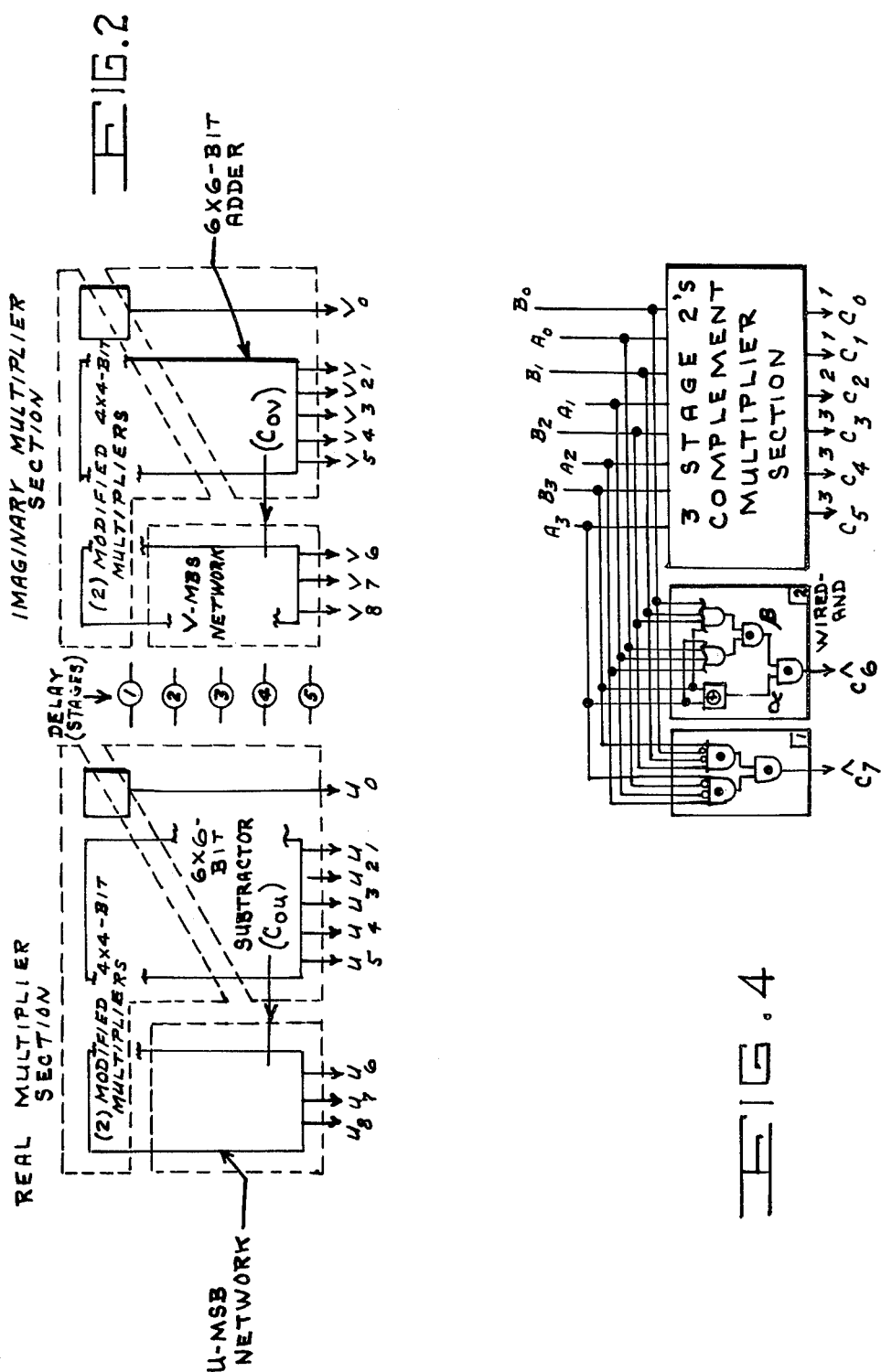
FIG. 2 is a diagram showing the logic partitioning used in the invention for the formation of the multiplying system.

The logic network structure internal to the universal logic gate (ULG) complex multiplier is denoted by the heavy line boxes shown in FIG. 2. The multiplier system which has 5-stage throughout delay is achieved in part by the manner in which it produces its most significant bit (MSB) outputs ($u_8, u_7, u_6$) and ($v_8, v_7, v_6$). These signals are realized separately as functions of the complex multiplier inputs and of internal carry subfunctions $C_{OU}$ and $C_{OV}$ (respectively) in two networks which generate the three U MSBs and the three V MSBs. The least significant bits (LSBs) $u_0$ and $v_0$ each depend only on the inputs $a_0, b_0, c_0$, and $d_0$, and each LSB is realized in a 1-cell, 1-stage network. The intermediate bits ($u_5 - u_1$) and ($v_5 - v_1$) and the subfunctions $C_{OU}$ and $C_{OV}$ are realized in networks each incorporating two of the three-stage circuits used to implement the intermediate five bits ($C_5 - C_1$) in the 4 × 4 bit 2's complement real multiplier described in U.S. Pat. No. 3,914,589 issued to James R. Gaskill, Jr., et al, entitled "FOUR-BY-FOUR BIT MULTIPLIER HAVING THREE STAGES OF LOGIC CELLS".

The logic design embodied in the present invention was derived using logic partitioning techniques and selected arithmetic properties of 2's complement coded complex multiplication using a somewhat complicated and iterative process. However, the invention can be considered to be described in terms of three steps: logic partition, section logic design, and logic design integration. A novel logic partition denoted by the dashed lines in FIG. 2 is established using the baseline design of FIG. 1 as a starting point. The new partition defines logical characteristics of modified multipliers, a 6 × 6 bit adder, a 6 × 6 bit subtractor, and two MSB logic circuits, all tailored for operation inside a complex multiplier. The ULG logic designs are developed first for those multiplier sections requiring change (relative to the design of FIG. 7 of U.S. Pat. No. 3,914,589) and for the MSB circuits. Then ULG-oriented designs are developed for the adder and subtractor in a manner permitting these sections to mesh with modified multiplier sections, thereby reducing overall complex multiplier delay. Inputs enter the adder and subtractor at the three different gating levels at which they are generated in the modified multipliers. The various sections are "merged" resulting in an integrated complex multiplier design. The merger is accomplished by taking advantage of the synthesis capabilities of the ULG compont cascode cell networks and by taking advantage of the multi-level input adder and subtractor designs. The logic partition described herein defines the decomposition of the complex multiplier into sections and specifies the logical characteristics of each. In the following discussion the properties of the modified multiplier sections are defined first and then used subsequently to specify operations of the adder and subtractor sections. Descriptions of the networks used to generate the V-MSBs and U-MSBs driven by the modified multipliers and by the carry functions generated respectively in the adder and subtractor sections conclude this discussion.

Figure 3:
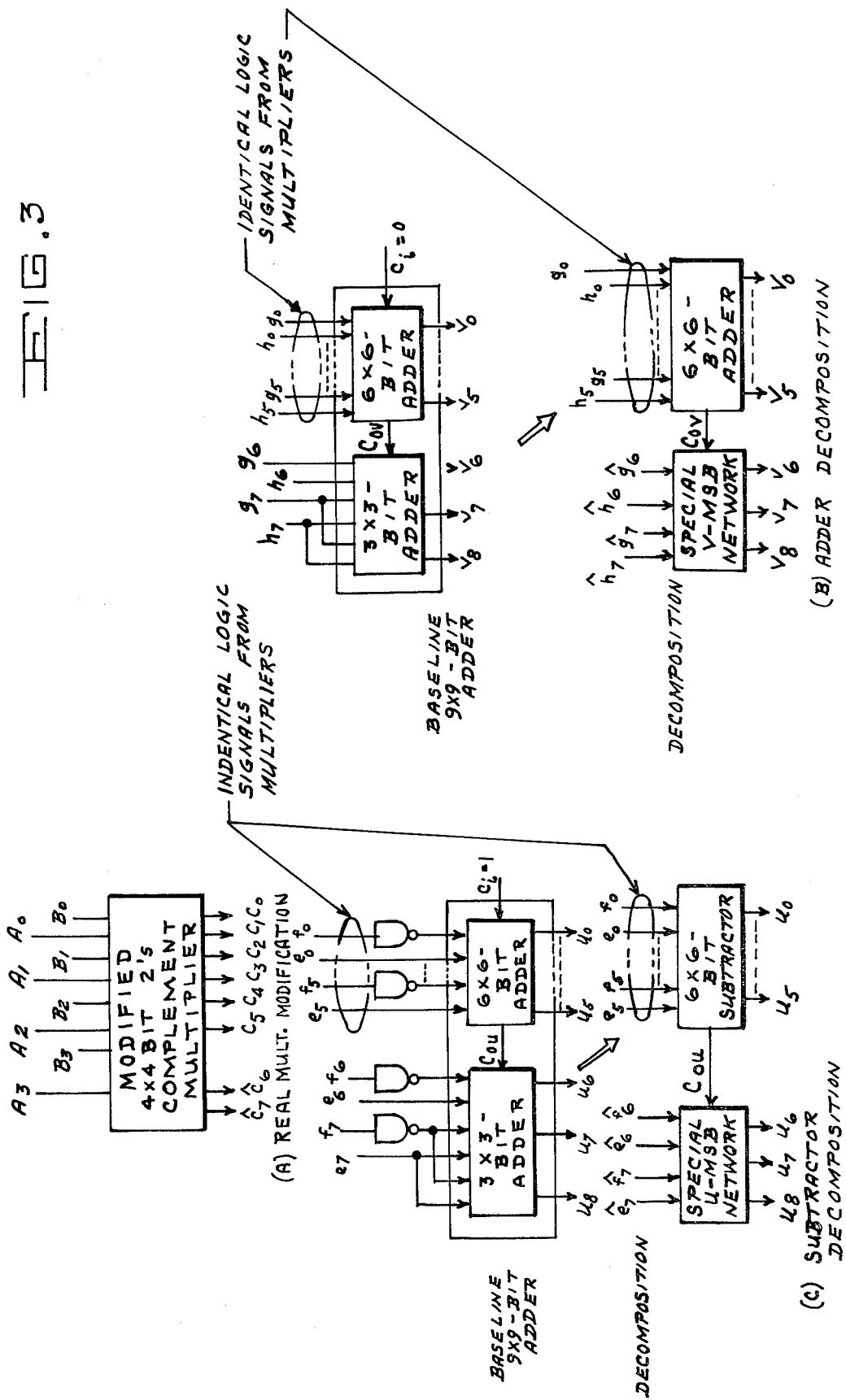
FIG. 3 is a diagram showing the development of the complex multiplying system from partitioning of the sections.

Four identical modified 4 × 4 bit multipliers having the logical input/output properties described in FIG. 3 are used in the complex multiplier partition. These modified multipliers generate output bits $\hat{C}_7$ and $\hat{C}_6$ which differ from their counterparts produced in conventional 2's complement multipliers (e.g., used in the baseline design). In this regard, when the product of the inputs A and B is exactly 64 (i.e., A = B = −8), $\hat{C}_7 = 1$, $\hat{C}_6 = 0$, and all less significant outputs $C_i = 0$. For all other input states, $\hat{C}_7 = 0$ and the remaining output bits $\hat{C}_6, C_5, \ldots C_0$ are defined to convey the product in a "standard" 7 bit 2's complement code.

The novel specified coding has the property that its six LSBs correspond for every input state to the six LSBs produced by a conventional 2's complement 4 × 4 bit multiplier. This property, used in subsequent discussions, may be predicted by noting first that for integers $x$, $-64 \leq X \leq 63$, the first seven bits of an 8 bit 2's complement code comprise a 7 bit 2's complement code. Then it is observed that for the only remaining product, 64, the 6 LSBs produced by both the conventional and modified multipliers are all zero.

The multiplier modifications motivate a reduced throughput delay partition for the ensemble complex multiplier. This improved partition can be described in relation to the adder and subtractor decompositions suggested in FIGS. 3(b) and 3(c) respectively, as discussed below.

The adder decomposition entails replacing the 9 × 9 bit adder (used in the baseline design) with a 6 × 6 bit adder and the V-MSB network as shown in FIG. 3. The 6 × 6 bit adder correctly generates the LSB complex multiplier outputs $V_6, \ldots, V_0$ when driven by the signals $g_5, \ldots, g_0$ and $h_5, \ldots, h_0$ (output respectively as their six LSBs by two modified multipliers) because these signals are the same as their counterparts used in the baseline design. The carry-out signal $C_{0V}$ produced by the 6 × 6 bit adder is fed into the V-MSB network described below.

Realization of the real part of the complex multiplier output is based on the decomposition delineated in FIG. 3(c). As suggested, the 9 × 9 bit adder (with $C_i = 1$) and the inverters used in the baseline design are replaced in the decomposition by a 6 × 6 bit subtractor network and the U-MSB network. The subtractor is required to implement the function performed by a 6 × 6 bit adder with its carry input, $C_i = 1$, driven by inputs $e_5, \ldots, e_0$ and $\overline{f}_5, \ldots, \overline{f}_0$. With these logical characteristics, when driven by signals $e_5, \ldots, e_0$ and $f_5, \ldots, f_0$ from the modified multipliers (the same as their counterparts in the baseline design) the subtractor correctly generates the complex multiplier outs $u_5, \ldots, u_0$. So driven, it also generates the carry out signal $C_{0U}$ which is fed to the U-MSB network.

The V-MSB network, driven by two MSB pairs, $\hat{g}_7$, $\hat{g}_6$ and $\hat{h}_7$, $\hat{h}_6$ (output by the G and H modified multipliers and by the function $C_{0V}$ (produced in the 6 × 6 bit adder) generates complex multiplier MSBs $v_8$, $v_7$, and $v_6$. The concurrent characteristics of these input and output signals constrain the specific (Boolean) V-MSB network output functions in the following manner.

The input signal characteristics can be described relative to the states of the $\hat{g}_7$ and $\hat{h}_7$ signals. In that regard it is noted that $\hat{g}_6 = 0$ whenever $\hat{g}_7 = 1$ and similarly, $\hat{h}_6 = 0$ whenever $\hat{h}_7 = 1$, where both of these relationships are direct results of thd modified multiplier output coding specified above. Another consequence of this coding is that whenever $\hat{g}_7 = 1$ or $\hat{h}_7 = 1$, one of the arrays input to the 6 × 6 bit adder (adjacent to the V-MSB network) is "all zero" (i.e., $\hat{g}_7 + \hat{h}_7 = 1$ implies $g_i = 0$ or $h_i = 0$ ($i = 0, 1 \ldots, 5$)). Thus the adder generates a zero carry out signal $C_{0V} = 0$ whenever $\hat{g}_7 + \hat{h}_7 = 1$.

The requirements on the V-MSB outputs can be treated separately for the case in which $\hat{g}_7 + \hat{h}_7 = 0$ and in the case in which $\hat{g}_7 + \hat{h}_7 = 1$. When $\hat{g}_7 + \hat{h}_7 = 0$ the specific Boolean equations governing $v_8$, $v_7$ and $v_6$ can be deduced directly from the adder partition shown in FIG. 3 and the modified multiplier coding. When $\hat{g}_7 + \hat{h}_7 = 0$, $-56 \leq G, H \leq 49$ and thus $-112 \leq G + H \leq 98$. Consequently the two MSBs of a 9 bit 2's complement code for G + H ($v_8$ and $v_7$) coincide, and only the first 8 bits of this code are needed to represent G + H. These bits could be generated in an 8 × 8 bit adder driven by the seven LSBs from each modified multiplier. With its MSB and next-MSB inputs hardwired together in each input array and driven respectively by $\hat{g}_6$ and $\hat{h}_6$, and with its ninth output bit discarded, this adder would produce the required output code. The adder could be made up of a 6 bit section and a 2 bit section. Because the latter would be driven only by the signals $\hat{g}_6$, $\hat{h}_6$ and $C_{0V}$, its logical behavior may be described as follows. The first output from the 2 bit adder would be given by $v_6 = \hat{g}_6 \oplus \hat{h}_6 \oplus C_{0V}$ and the second 2 bit adder output would be given by $v_7 = T_2(\hat{g}_6, \hat{h}_6, \overline{C}_{0V})$ wherein the symbol $\oplus$ signifies an EXCLUSIVE-OR operation and $T_2(x, y, z)$ is a three-input threshold function which is "true" or at a logic 1 value whenever any two or more of the inputs $x$, $y$, and $z$ are true or at a logic 1 value. When $\hat{g}_7 + \hat{h}_7 = 1$, either $G = 64$ or $H = 64$, and consequently $G + H > 0$. For this case, $v_8 = 0$ since this "sign" bit is "1" only for negative V values. For $\hat{g}_7 + \hat{h}_7 - 1$, $v_7 = 1$ only when both $\hat{g}_7 = 1$ and $\hat{h}_7 = 1$ (i.e., $\hat{g}_7\hat{h}_7 = 1$) because with $G + H > 0$, $V \geq 128$ only if $G = 64$ and $H = 64$. Moreover, in this case $V = 128$ exactly and thus $v_6 = 0$. Hence $v_6 = 1$ for $\hat{g}_7 + \hat{h}_7 = 1$ only when $\hat{g}_7\hat{h}_7 = 0$ and also when $G + H \geq 64$.

Given the Boolean equations governing outputs $v_8$ and $v_7$ for the case in which $\overline{\hat{g}_7} + \overline{\hat{h}_7} = 1$, complete Boolean equations governing $v_8$ and $v_7$ can be written "directly" as $$v_8 = \overline{\hat{g}}_7 \overline{\hat{h}}_7 T_2(\hat{g}_6, \overline{h}_6, \overline{C}_{0V})$$

and $$v_7 = \hat{g}_7 \hat{h}_7 + \overline{\hat{g}}_7 \overline{\hat{h}}_7 T_2(\hat{g}_6, \hat{h}_6, \overline{C}_{0V}).$$

In these expressions, the plus sign signifies a logical-OR, juxtaposition of variables signifies a logical-AND of these variables, and $T_2(x, y, z)$ signifies the threshold or majority function which is "true" or at a logical 1 value any time any two or more of the variables $x$, $y$, and $z$ is "true" or at a logical 1 value.

Composite synthesis of the signal $v_6$ is more complex due to the interdependence of signals $C_{0V}$, $\hat{g}_6$ and $\hat{h}_6$ on the signals $\hat{g}_7$ and $\hat{h}_7$. Decomposition details pertaining to the $v_6$ synthesis can be shown in a Karnaugh map where this interdependence is found to result in a large number of logically impossible input states. The Karnaugh map would also display the required $v_6$ behavior for $\hat{g}_7 = \hat{h}_7 = 0$ and for the states which can occur when $\hat{g}_7 + \hat{h}_7 = 1$. One of several logic functions satisfying required behavior for all logically possible $\hat{g}_7$, $\hat{h}_7$ states is given by $$v_6 = P_5(\hat{g}_6, \hat{h}_6, \hat{g}_7, \hat{h}_7, C_{0V}),$$

where $P_5(w, s, t, x, y)$ is a parity function on the five input variables $w, s, t, x, y$, which is true precisely when any odd number (1, 3, or 5) of these variables is "true" or at a logical "1" value. This particular function was chosen because besides fulfilling $v_6$ requirements it is "perfectly" decomposable and therefore can be implemented in a manner reducing the serial delay subtended between the input signals and the $v_6$ output.

The logical properties of the inputs to the U-MSB network depend on the signals $\hat{e}_7$ and $\hat{f}_7$. The dependence of $\hat{e}_6$ on $\hat{e}_7$ and of $\hat{f}_6$ on $\hat{f}_7$ are analogous to the relationship between $\hat{g}_6$ and $\hat{g}_7$ or between $\hat{h}_6$ and $\hat{h}_7$. However, the behavior of the carry function $C_{0U}$ differs from the behavior of the function $C_{0V}$ considered previously. In that regard, when $\hat{f}_7 = 1$, all other signals, $f_6 - f_0$, output from the F-multiplier section are at a logical 0 state. Thus, the 6 × 6 bit subtractor (which in effect adds the complements of these signals and a 1 carry input) produces an output carry $C_{0U} = 1$ regardless of the states of its other, $e_i$ input signals, when $\hat{f}_7 = 1$.

The real part of the complex product, $U = E - F$, is constrained as $-120 \leq U \leq 120$, and consequently an 8 bit 2's complement code is adequate to represent U. Because in a 9 bit 2's complement code for values with the above range $u_8$ and $u_7$ are identical, $u_8$ can be implemented as a copy of the signal $u_7$. Thus a 9 bit U-output code can be used (to be consistent with the 9 bit code required to convey the complex multiplier's V output) without additional hardware cost.

The output requirements for signals $u_7$ and $u_6$ presented for the four separate states of the $\hat{e}_7$, $\hat{f}_7$ signal pair have characteristics that were deduced through a procedure similar to the one used to define the required characteristics of the signals $v_8 - v_6$.

The different input and output requirements for the signal $u_7$ can be combined "directly" in defining the Boolean equation for $u_7$ given by $$u_7 = \overline{\hat{e}}_7(\hat{f}_7 + T_2(\hat{e}_6, \overline{\hat{f}}_6, C_{0U})),$$

where + signifies a logical —OR, juxtaposition of variables signifies logical-AND, and $T_2()$ signifies the threshold function described above.

The decomposition required to implement the $u_6$ function is somewhat more complex due to the interdependence of the functions $C_{0U}$, $\hat{e}_6$ and $\hat{f}_6$ on the functions $\hat{e}_7$ and $\hat{f}_7$. These interdependencies result in a number of logically impossible states that would be suggested in the Karnaugh map which also displays required $u_6$ behavior for all logically possible states.

The function $u_6$ can be realized as $$u_6 = P_5(\hat{e}_6, \hat{f}_6, \hat{e}_7, \hat{f}_7, C_{0U})$$

where $P()$ is the five-input parity function defined previously, was selected because it fulfills required behavior and because it is "perfectly" decomposable.

ULG oriented logic designs for those sections of the 4 × 4 bit 2's complement multipliers requiring change relative to U.S. Pat. No. 3,914,589 and for the V-MSB and U-MSB networks are presented first below. Then designs for the 6 × 6 bit adder and subtractor sections are derived. Satisfying the logic requirements previously defined, the particular designs used in each of the above complex multiplier sections were developed in a manner permitting the sections to mesh together with the three-stage multipliers in a unified five-stage network having the structure delineated (by the heavy lines) in FIG. 3.

Figure 7:
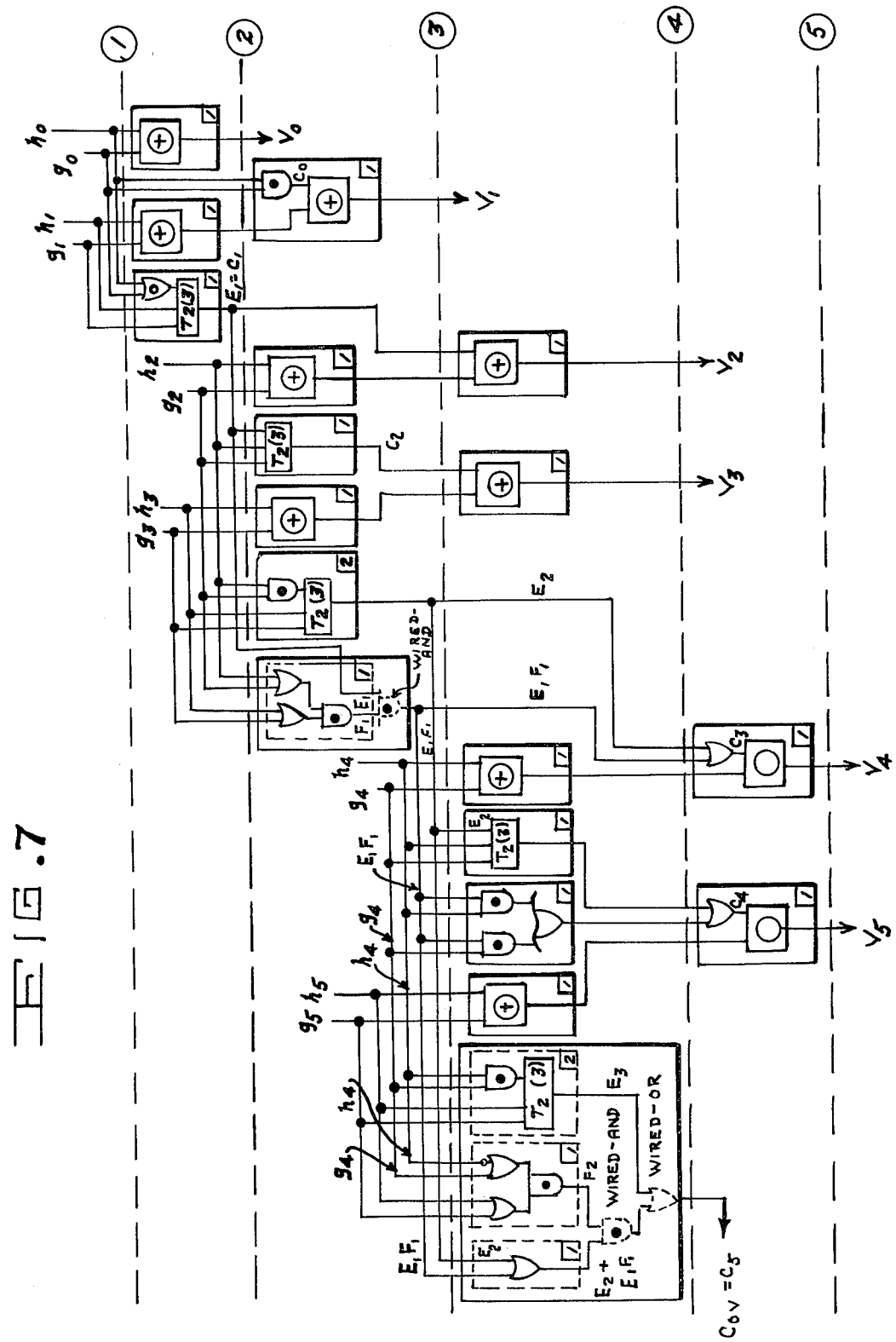
FIG. 7 is the adder logic diagram for generating the intermediate bits of imaginary term of the complex product.

The subnetwork design for the section of each modified 4 × 4 bit multiplier which produces its six LSB outputs is the same as its counterpart in the 4 × 4 bit 2's complement multiplier shown in FIG. 7 of U.S. Pat. No. 3,914,589 because the logical characteristics of the six LSB signals are identical in both multipliers. However, modified multiplier outputs $C_7$ and $C_6$ are realized by a new subnetwork which replaces the one realizing the $C_7$ and $C_6$ outputs in the previously referenced multiplier. Boolean equations governing $C_7$ and $C_6$ consistent with the output coding requirements outlined above are $$\hat{C}_7 = (A_3\overline{A}_2\overline{A}_1\overline{A}_0)(B_3\overline{B}_2\overline{B}_1\overline{B}_0)$$

and $$\hat{C}_6 = (A_3 \oplus B_3)(A_3+A_2+A_1+A_0)(B_3+B_2+B_1+B_0)$$

where $\oplus$ designates an EXCLUSIVE-OR operation and where logical-OR and logical-AND operations are designated as described above. Thus, $C_7 = 1$ if and only if the multiplier input numbers $A = B = -8$ so that their product $AB = 64$. $C_6 = 1$ if and only if either $A<0$ and $B>0$ or $A>0$ and $B<0$, which in both cases results in the product $AB<0$.

FIG. 4 presents a ULG oriented logic design for the subnetwork realizing the $\hat{C}_7$ and $\hat{C}_6$ outputs. The number shown in the lower right corner of each box designates the number of cascode cells used in each network. The section at the left shows that $\hat{C}_7$ is formed in a one cell standard synthesis using the building block network suggested in FIG. 5 of U.S. Pat. No. 3,925,684 issued to James R. Gaskill, et al, and entitled "Universal Logic Gate". The next section designates that output $\hat{C}_6$ is realized in a one-stage 2-cell network wherein one cell is EXCLUSIVE-OR connected in the manner shown in FIG. 7 of the aforementioned U.S. Pat. No. 3,925,684, forming the subfunction $\alpha = A_3 \oplus B_3$. The second cell uses the same inputs (X and Z) and collector output and cross-connections (A and BD) as are used in a standard synthesis building block network. However, it is driven by uncomplemented inputs and produces its complemented output at the A-collector node and its uncomplemented output at the conjoined B and D collector nodes. Consequently, this network is equivalent to two OR gates feeding an AND gate, and when connected as shown generates the subfunction $$\beta = (A_0 + A_1 + A_2 + A_3)(B_0 + B_1 + B_2 + B_3)$$

The BD collector node from the second cell is WIRE-AND connected to the AD collector node at the EXCLUSIVE-OR connected cell, thereby realizing $\hat{C}_6$ through a load cell as $\hat{C}_6 = \alpha\beta$.

The number of stages required to realize each of the six LSB outputs $C_5, \ldots, C_0$ in the modified multiplier is shown in FIG. 4 adjacent to each signal output point in the diagram. These delay data constrain the designs of the adder and subtractor sections as described subsequently.

Figure 5:
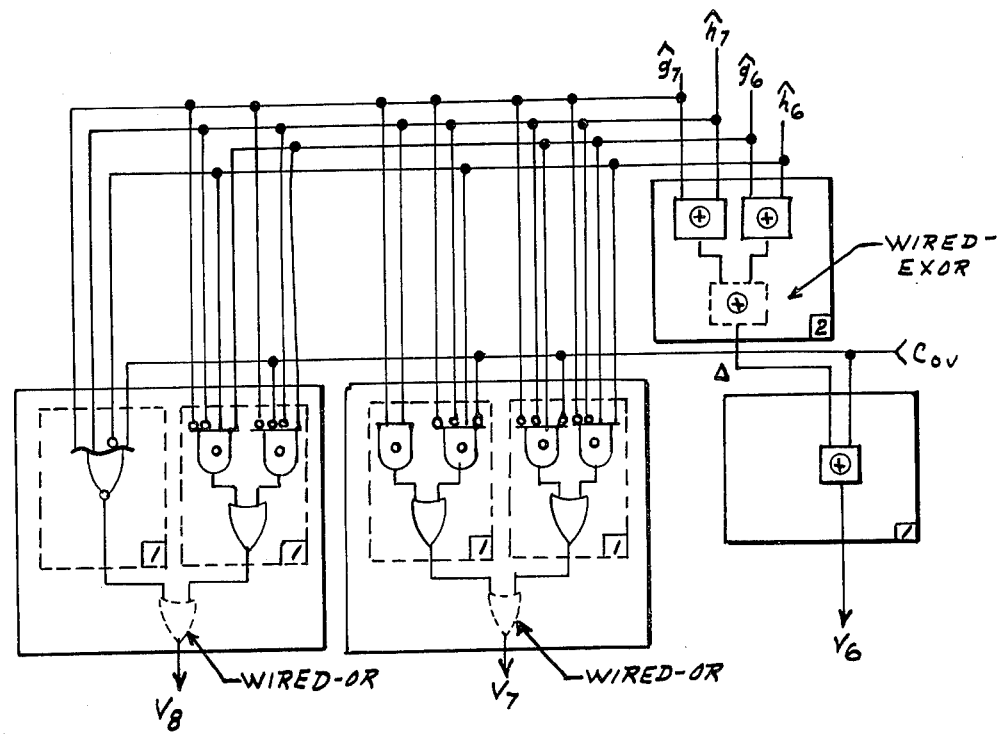
FIG. 5 is a network logic diagram for generating the most significant bits of the imaginary term of the complex product.

FIG. 5 shows a ULG design-oriented logic diagram for the V-MSB network which implements the Boolean functions for $v_8$, $v_7$ and $v_6$, given above. It specifies the interconnection of building block networks and the logical characteristics of (and implicitly the programming connections used in) each. In this regard the output $v_8$ is designated as realized using a two-cell standard synthesis building block network of the form described in FIG. 6 of the aforementioned U.S. Pat. No. 3,925,684 and the same two-cell standard synthesis is designated for forming output $v_7$. Output $v_6$ is realized in a one-cell EXCLUSIVE-OR connected network driven by the $C_{0V}$ input and the intermediate function $\Delta$. This intermediate function is realized in a two-cell DOUBLE EXCLUSIVE-OR building-block network configured precisely as shown in FIG. 12(a) of the aforementioned U.S. Pat. No. 3,925,684.

The particular overall network topology shown in FIG. 5 is preferred because it permits synthesis of each of the three V-MSB functions in a manner introducing only one additional stage delay beyond the delay required to realize the V-MSB input function, $C_{0V}$. In this regard it is noted that each of the other V-MSB inputs, $\hat{g}_7$, $\hat{h}_7$, $\hat{g}_6$, $\hat{h}_6$ is realized in one stage in the modified multipliers, so that the intermediate function $\Delta$ is realized in two stages.

Figure 6:
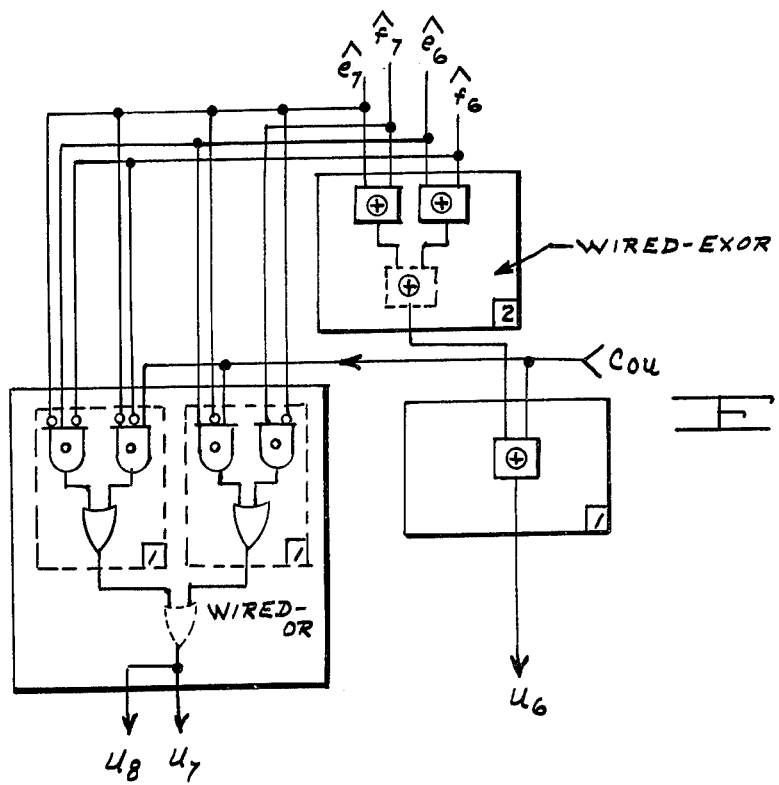
FIG. 6 is a network logic diagram for generating the most significant bits of the real term of the complex product.

FIG. 6 describes the manner in which specified building block networks are interconnected to implement the Boolean functions for the $u_7$ ($u_8$) and $u_6$ outputs given alone. The overall U-MSB network topology is analogous to the one implemented in the V-MSB networks and the same types of ULG synthesis building blocks are used in both networks.

The 6 × 6 bit adder section implemented in the complex multiplier meshes tightly with the "middle" sections of the G and H modified multipliers. The adder operates on three sets of input signals $$(g_0, h_0, g_1, h_1) (g_2, h_2, g_3, h_3) \text{ and } (g_4, h_4, g_5, h_5)$$

produced in the modified multiplier sections respectively in one, two and three gating stages. It generates the V-MSB input signal $C_{0V}$ in one additional gating stage (i.e., in a total of four stages following the complex multiplier inputs), and its outputs $v_5, \ldots, v_0$ are generated in the combined adder/multiplier section network through worst-case paths subtending at most five gating stages.

The small ensemble complex multiplier throughout delay is effected in part by the particular Full Carry Look Ahead (FCLA) circuit structure incorporated in the adder section. This circuitry implements the internal subfunctions $E_1$, $E_2$, $E_3$, $F_1$ and $F_2$ first and then shares several as it generates the carry functions $C_0$, $C_1$, $C_2$, $C_3$, $C_4$, and $C_5 = C_{0V}$. In conjunction with the first five carry functions, complex multiplier outputs $v_5, \ldots, v_0$ are realized as $$v_k = g_k \oplus h_k \oplus C_{k-1} \text{ for } k = 5, \ldots, 0$$

where $$C_{-1} \triangleq 0.$$

A ULG design-oriented logic diagram for the adder section is shown in FIG. 7. It specifies an interconnection of ULG synthesis building blocks which realizes the carry subfunctions, and then implements the outputs $v_5, \ldots, v_0$ according to the above Boolean equation. The specific network topology and the particular building-block network assignments shown in FIG. 7 respectively correspond as closely as possible to the network topology and cascode cell functions mechanized by the adder section in the complete complex multiplier. Accordingly although standard synthesis and EXCLUSIVE-OR building blocks are used and designated in the manner discussed in the preceding, two types of threshold building blocks are specified in the logic diagram. Both types are designated by the notation $T_2(3)$, but two different networks are used. One-cell networks are employed in all cases except in the subnetworks implementing the $E_2$ and $E_3$ functions which are used in forming the $C_3$ and $C_{0V}$ signals. In those cases only the signals (and not their complements), e.g, $g_5$ and $h_5$, are implemented in the modified multiplier sections and are available as adder inputs. A two-cell threshold building block network therefore is used.

Figure 8:
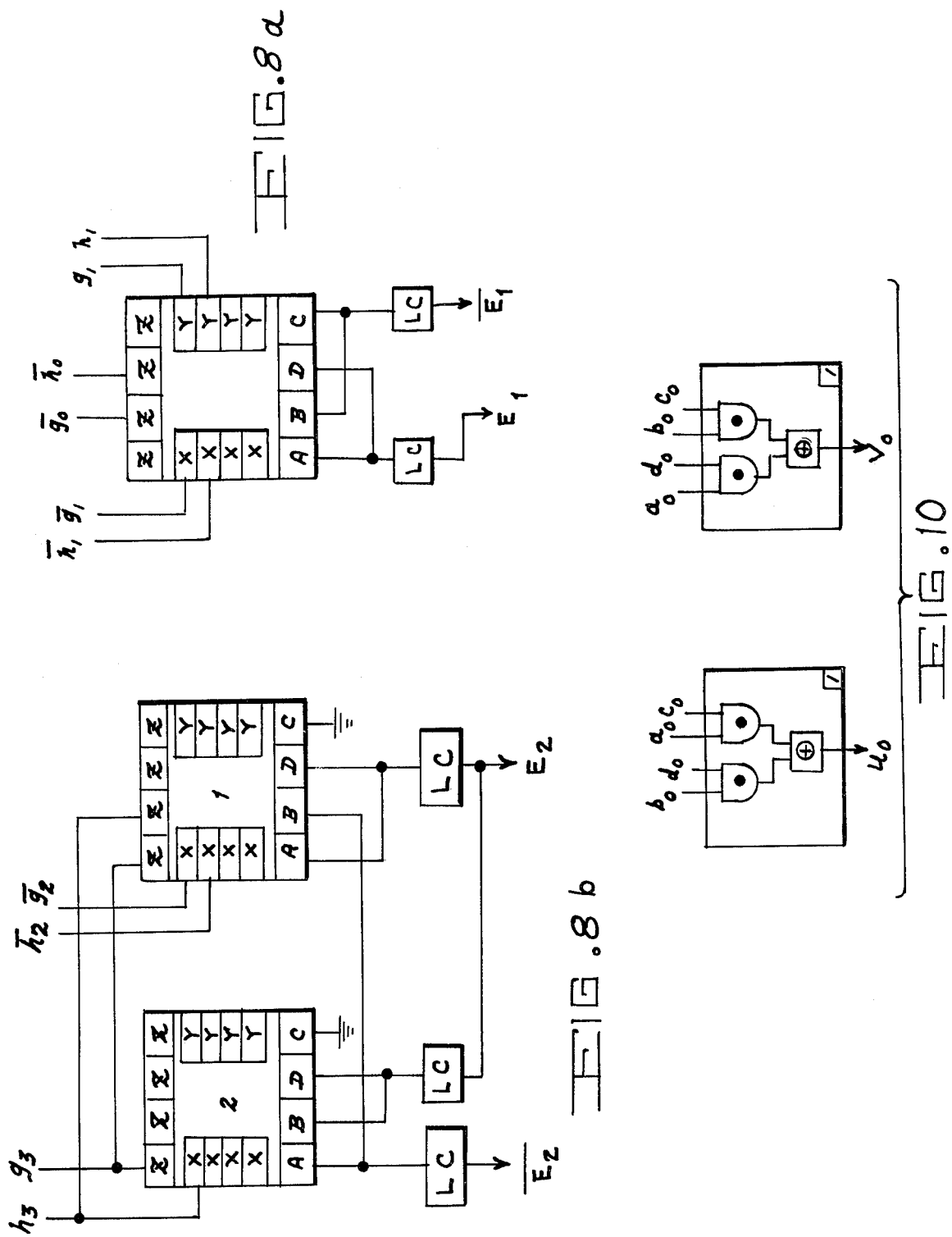
FIG. 8a is a logic diagram showing a single cascode cell connection for realizing a threshold function.
FIG. 8b is a logic diagram showing two cascode cells connected for realizing a threshold function in the adder and subtractor sections.

FIG. 8a shows a cascode cell schematic diagram for generating the function $E_1$ using a single cell threshold building block. This shows the manner in which input signals are applied at the cascode cell X, Y, and Z inputs and the manner in which the cascode cell A, B, C, and D collectors are cross-connected and fed to load cells (LC) for forming the outputs $E_1$ and $\bar{E}_1$. These symbols relate directly to circuit schematic diagrams in the manner described in U.S. Pat. No. 3,925,684. The same or a similar network topology is used for generating all other threshold functions except $E_2$ and $E_3$. The manner in which the $E_2$ function is generated is shown in FIG. 8b. These two cascode cells are driven by inputs $\bar{g}_2$, $\bar{h}_2$, $g_3$, and $h_3$ and have their collectors cross-connected and then fed into load cells, generating the functions $E_2$ and $\bar{E}_2$.

The 6×6 bit subtractor section design is similar to the one implemented in the 6×6 bit adder section. In this regard, the subtractor operates on three sets of input signals $(e_0, \bar{f}_0, e_1, \bar{f}_1)$, $(e_2, \bar{f}_2, e_3, \bar{f}_3)$ and $(e_4, \bar{f}_4, e_5, \bar{f}_5)$ produced by the "middle" sections of the E and F modified multipliers respectively in one, two, and three gating stages. The combined network comprising these multiplier sections and the subtractor produces the $C_{0U}$ signal in an ensemble throughout delay of four stages and generates the outputs $u_5, \ldots, u_0$ in an ensemble delay of at most five stages.

The subtractor implements a FCLA structure wherein the internal subfunctions $G_1, \ldots, G_3$, $F_1$, and $F_2$ are generated and shared in the subsequent realization of the carry functions $C_0, \ldots, C_4$ and $C_5 = C_{0V}$. These carry signals are employed with the signals $e_i$ and $\bar{f}_i (i = 0, \ldots, 5)$ input to the subtractor in forming its outputs as $$u_k = e_k \oplus \bar{f}_k \oplus C_{k-1} \text{ for } k = 0, 1, \ldots, 5$$

where $$C_{-1} \triangleq 1$$

Figure 9:
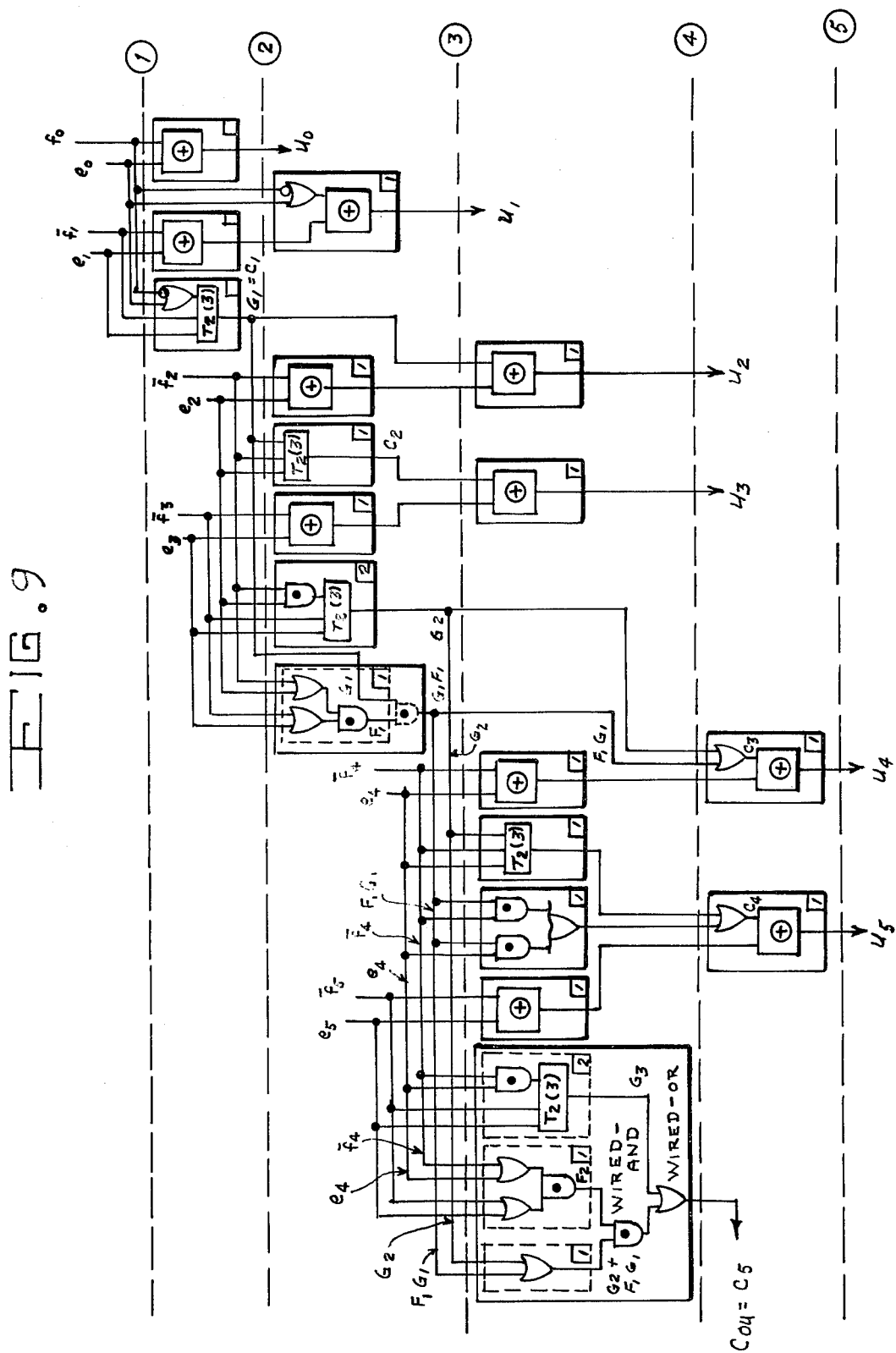
FIG. 9 is the subtractor logic diagram for generating the intermediate bits for the real term of the complex product.

FIG. 9 is a logic diagram for the subtractor section specifying the same family of synthesis building blocks as is used in the adder section. Moreover, similar to the logic diagram for the adder section, the network topology and building block assignments shown correspond closely to the network topology and the cascode cell functions mechanized in the complex multiplier.

The LSB's $u_0$ and $v_0$ are realized by one cell EXCLUSIVE-OR connected networks having the gate equivalent circuits shown in FIGS. 10a and 10b respectively.

What is claimed is:

1. A 2's complement system for multiplying two complex numbers with each input being one of said two complex numbers with each having a real and imaginary term and the system generating a complex product as a pair of real and imaginary terms, comprising:
   a. a pair of real and a pair of imaginary 4×4 bit 2's complement multipliers with the multipliers having as inputs said two complex numbers and having output bits with the pair of real multipliers providing two most significant bits;
   b. a first subtractor section fed by each of the six least significant bits of each of the outputs of the pair of real multipliers generating the six least significant bits of the real term of the complex product with the first subtractor section also generating a carry bit;
   c. a second subtractor section fed by the two most significant bits of each of the pair of real multipliers and fed by a carry bit generated by the first subtractor section generating the three most significant bits of the real term of the complex product;
   d. a first adder section fed by the first six least significant output bits of each of the pair of imaginary multipliers generating the six least significant bits of the imaginary term of the complex product and a carry bit;
   e. a second adder section fed by the two most significant bits of each of the imaginary multipliers and fed by a carry bit generated by the first adder section generating the three most significant bits of the imaginary term of the complex product.

2. A 2's complement system for multiplying complex numbers according to claim 1 wherein the two most significant bits of the first real multiplier are generated by a first single logic gating stage, the two most significant bits of the second real multiplier are generated by a second single logic stage, the two most significant bits of the first imaginary multiplier are generated by a third single logic stage, and the two most significant bits of the second imaginary multiplier are generated by a fourth single logic stage.

3. A 2's complement system for multiplying complex numbers according to claim 1 wherein the second through seventh least significant bits of the two real multipliers and the second through seventh least significant bits of the two imaginary multipliers are generated in logic networks having at most three gating stages in worst case paths.

4. A 2's complement system for multiplying complex numbers according to claim 3 wherein the two real and two imaginary multipliers are made up of universal logic gate cascode cells.

5. A 2's complement system for multiplying complex numbers according to claim 1 wherein the first adder and first subtractor sections are connected to the multipliers so that no more than two gating stages are added to the delay through the multiplier in worst case signal paths through the adder and subtractor sections and wherein the carry bits are generated in networks which add only one stage delay in the signal paths to the delay through the multipliers.

6. A 2's complement system for multiplying complex numbers according to claim 5 wherein universal logic gate cascode cells comprise the first adder and first subtractor sections and wherein single stage parallel universal logic gate cascode cells generate the carry output bits.

7. A 2's complement system for multiplying complex numbers according to claim 1 wherein the second adder section and the second subtractor add no more than one gating stage to the signal paths initiated by the carry in bits respectively from the first adder and first subtractor sections.

8. A 2's complement system for multiplying complex numbers according to claim 7 wherein the second adder and second subtractor sections consist of universal logic gate cascode cells.

9. A 2's complement system for multiplying complex numbers according to claim 1 wherein the complete complex multiplier consists of a network of no more than five gating stages.

* * * * *